United States Patent [19]

Ishii

[11] Patent Number: 4,882,701

[45] Date of Patent: Nov. 21, 1989

[54] LOOKAHEAD PROGRAM LOOP CONTROLLER WITH REGISTER AND MEMORY FOR STORING NUMBER OF LOOP TIMES FOR BRANCH ON COUNT INSTRUCTIONS

[75] Inventor: Hideshi Ishii, Tokyo, Japan

[73] Assignee: NEC Corporation, Tokyo, Japan

[21] Appl. No.: 249,254

[22] Filed: Sep. 23, 1988

Related U.S. Application Data

[63] Continuation of Ser. No. 898,201, Aug. 20, 1986, abandoned.

[30] Foreign Application Priority Data

Aug. 22, 1985 [JP] Japan .................................. 60-185328

[51] Int. Cl.⁴ .......................... G06F 9/00; G06F 9/06; G06F 9/38; G06F 9/42
[52] U.S. Cl. .................. 364/900; 364/261.3; 364/938.0
[58] Field of Search ... 364/200 MS File, 900 MS File

[56] References Cited

U.S. PATENT DOCUMENTS

| 3,573,854 | 4/1971 | Watson et al. | 364/200 |
|---|---|---|---|
| 3,593,306 | 7/1971 | Toy et al. | 364/200 |
| 3,766,527 | 10/1973 | Briley | 364/200 |
| 3,940,741 | 2/1976 | Horikoshi et al. | 364/200 |
| 3,980,991 | 9/1976 | Mercurio | 364/200 |
| 4,031,521 | 6/1977 | Hall et al. | 364/200 |
| 4,097,920 | 6/1978 | Ozga | 364/200 |
| 4,181,942 | 1/1980 | Forster et al. | 364/200 |
| 4,200,927 | 4/1980 | Hughes et al. | 364/200 |
| 4,370,711 | 1/1983 | Smith | 364/200 |
| 4,409,654 | 10/1983 | Wada et al. | 364/200 |
| 4,430,706 | 2/1984 | Sand | 364/200 |
| 4,435,756 | 3/1984 | Potash | 364/200 |
| 4,462,074 | 7/1984 | Linde | 364/200 |
| 4,463,422 | 7/1984 | Storer et al. | 364/300 |
| 4,471,433 | 9/1984 | Matsumoto et al. | 364/200 |
| 4,477,872 | 10/1984 | Losg et al. | 364/200 |
| 4,604,691 | 8/1986 | Akagi | 364/200 |
| 4,626,988 | 12/1986 | George | 364/200 |
| 4,654,785 | 3/1987 | Nishiyama et al. | 364/200 |
| 4,727,483 | 2/1988 | Saxe | 364/200 |
| 4,764,861 | 8/1988 | Shibuya | 364/200 |

FOREIGN PATENT DOCUMENTS 61-273637 12/1986 Japan .
WO87/04821 8/1987 World Int. Prop. O. .

OTHER PUBLICATIONS

J. Gonzalez et al, "Branch Mechanism for Program Loops", IBM Technical Disclosure Bulletin, vol. 25, No. 9, Feb. 1983, pp. 4569-4571.
IBM System/370 Principles of Operation, IBM Corp., GA22-7000-7, File No. 5370-01, 1981, pp. 7-11.

*Primary Examiner*—Ayni Mohamed
*Attorney, Agent, or Firm*—Foley & Lardner, Schwartz, Jeffery, Schwaab, Mack, Blumenthal & Evans

[57] ABSTRACT

A branch instruction processing unit executes a branch-on-count (BCT) instruction for loop control of a program by means of pipeline control. The unit includes a memory for storing the number of loops for each BCT instruction, a first storage register for storing the output of the memory, a detection circuit for detecting if the output of the memory is a "1" while the output is stored in the first storage register, a second storage register for storing the output of the first storage register, and a branch judgement circuit which judges if each instruction is taken in response to the detection of a "1" by the detection circuit while the output of the first storage register is being stored in the second storage register.

4 Claims, 6 Drawing Sheets

LOOKAHEAD PROGRAM LOOP CONTROLLER WITH REGISTER AND MEMORY FOR STORING NUMBER OF LOOP TIMES FOR BRANCH ON COUNT INSTRUCTIONS

This application is a continuation, of application Ser. No. 898,201, filed Aug. 20, 2986 now abandoned.

BACKGROUND OF THE INVENTION:

This invention relates to a branch instruction processing unit capable of executing branch-on-count instructions for controlling loops in a program.

In a program for scientific and technical computation such as DO loops of a FORTRAN program, the same processing is often repeated for a limited number of times. In this case, branch-on-count instructions (referred to as "BCT instructions" hereinafter) are frequently used as branch instructions. With a BCT instruction, the content of a designated register is read out, subtracted by "1" and then stored again in the original register. If the result of subtraction is "0", it is judged that the branching has not been successful, while if that result is other than "0", it is judged that the branching has been successful. Such a BCT instruction is placed at the end of a group of instructions to be looped and the location to be branched is indicated by the address of the topmost instruction of the group. After the number of looping times is loaded in a specific register, the instructions of the group are consecutively executed from the topmost instruction, and this group of the instructions is repeated a specific number of times.

In the prior art, two processing steps are taken serially to execute the BCT instruction; i.e., (1) the step of subtracting "1" from a specific register,
(2) the step of judging whether or not branching is taken based on the result of subtraction.

Since a conventional branch instruction processing unit must execute the processing step (2) after the execution of the processing step (1), each BCT instruction inconveniently takes longer time for execution than other branch instructions which do not need the subtraction process mentioned above (1).

In order to overcome this problem, there has been proposed a technique by Hitachi, Ltd. in the Japanese Pat. Publication No. 20385/1979. According to the proposed technique, a display register is provided corresponding to a general purpose register which stores the number of loop times in order to display whether the content of the register is "1" or not. In response to "1" written in the general purpose register, the display register is set. Prior to the execution of a BCT instruction, the content of the display register is read out and whether or not the branching is successful is judged depending on the read-out content.

This technique enables immediate judgement on whether or not the branching is to be taken depending on the content of the display register at the initiation of the execution of each BCT instruction and, therefore, can enhance the speed of execution. However, if a plurality of general purpose (GP) registers for storing the number of loop times are used to process a BCT instruction, a corresponding number of display registers must be employed for detecting which GP register is being used for the BCT instruction, thereby increasing the amount of hardware undesirably.

SUMMARY OF THE INVENTION

One object of the invention is, therefore, to provide a branch instruction processing unit capable of executing BCT instructions at higher speed to obviate the above-mentioned disdvantage in the prior art.

According to one aspect of the present invention, there is provided a branch instruction processing unit which executes BCT instructions for loop control of a program by means of pipeline control. The unit comprises a memory for storing the number of loop times of each BCT instruction, a first storing device for storing the output of the memory, a detection circuit for detecting whether or not the output of the memory is "1" while the output of the memory is stored in the first storing device, a second storing device for storing the output of the first storing device, and a branch judgement circuit which judges whether or not each instruction is taken in response to the detection of "1" by the detection circuit while the output of the first storing device is being stored in the second storing device.

BRIEF DESCRIPTION OF THE DRAWING

The above and other objects and features of the invention will become apparent from the following detailed description when taken in conjunction with the accompanying drawings in which.

Same reference numerals denote same structural elements.

DETAILED DESCRIPTION OF THE PREFERRED EMBODIMENTS

An embodiment of this invention will now be described in more detail referring to drawings.

Figure 1:
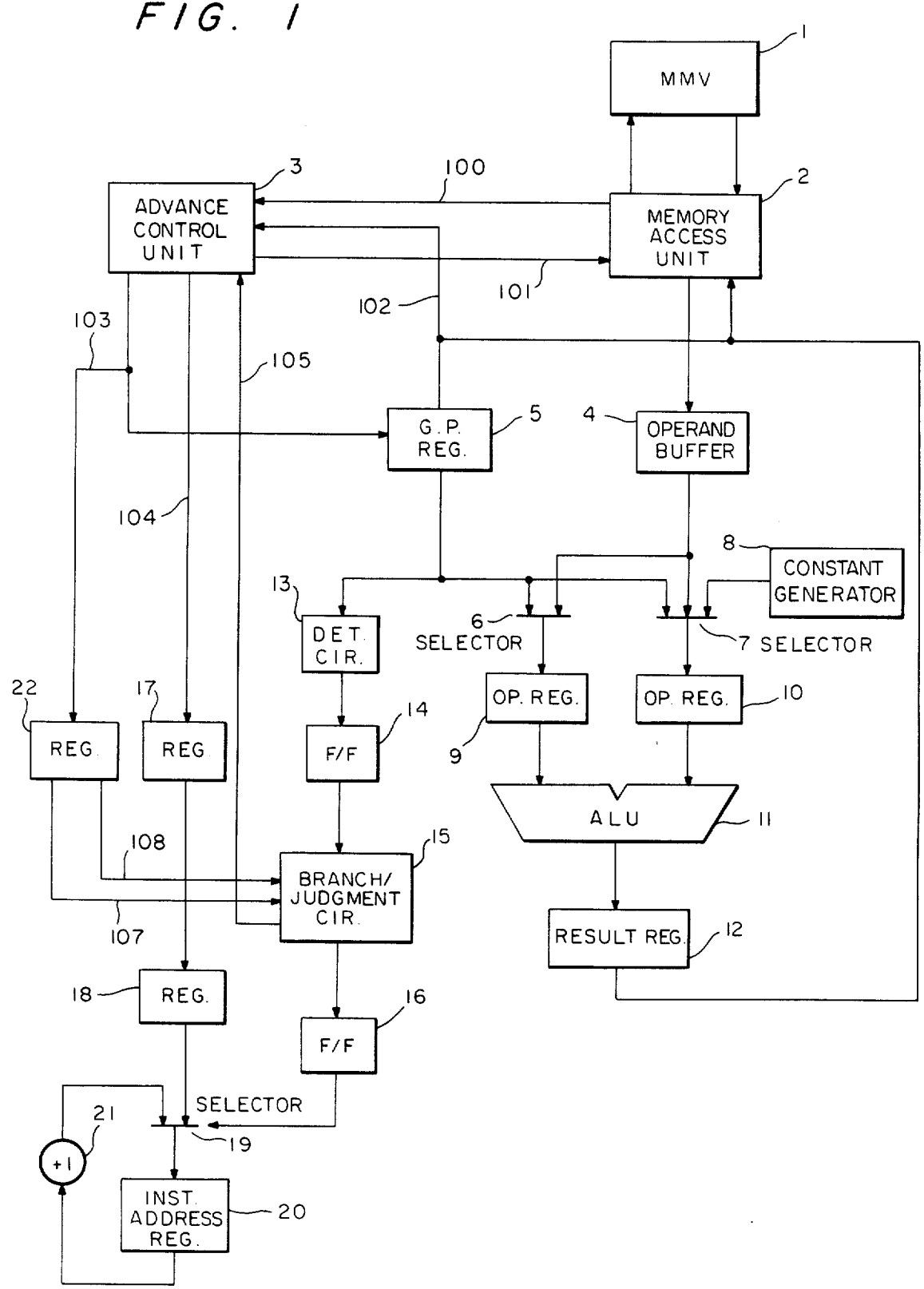
FIG. 1 shows a block diagram of one embodiment of this invention.

Referring to FIG. 1, the embodiment of this invention comprises a main memory unit (referred to as "MMU" hereinafter) 1 which stores programs or data, a memory access unit 2 for accessing the MMU 1, an advanced control unit 3 for decoding an instruction given from the MMU 1 via the memory access unit 2 and directing the unit 2 for operation of an operand such as reading out, an operand buffer 4 for storing an operand which has been read out from the MMU 1 in response to an operand read-out instruction from the unit 2, a general purpose (GP) register group 5 comprising a register file including sixteen GP registers which store operands of instructions and computation results, a selector 6 for selecting one operand or computation result from either the operand buffer 4 or the GP register group 5, a selector 7 for selecting an operand, computation result or constant from either one of the operand buffer 4, the GP register group 5, or a constant generator 8, an operand register 9 for storing the result of the selection from the selector 6, an operand register 10 for storing the result of selection from the selector 7. The embodiment further includes an arithmetic and logic unit (ALU) 11 for performing an arithmetic computation as specified based on values from these operand registers 9 and 10, a result register 12 for storing the computation result from the ALU 11, a detection circuit 13 for detecting whether or not the content of one GP register selected out of the GP register group 5 is "1" ("00 .... 01" in binaries), a flip-flop 14 set in response to the detection of "1" from the detection circuit 13, a register 22 for storing control information for branch instructions fed from the advanced control unit 3, a branch judgement circuit 15 responsive to an instrument type given from the register 22 via a signal line 107 and a branch timing signal given therefrom via a signal line 108 to judge whether the branch is not to be taken, when the value of the flip-flop 14 is "1" and to judge whether branch is to be taken, when that value is "0" and when the given branch type indicates a BCT instruction, a flip-flop 16 set in response to the judgement by the branch judgement circuit 15, registers 17 and 18 for storing the branch destination addresses of branch instructions sent when the advanced control unit anticipates successful branching, an instruction address register 20 for retaining the address of instructions being executed, and an adder 21 for adding "1" to the content of the instruction address register 20 and a selector 19, responsive to the output from the flip-flop 16 to select data from the content of the register 18 and from the adder 21.

The operation of the invention unit will now be described hereinafter.

A BCT instruction is read out in the following steps.

Figure 2:
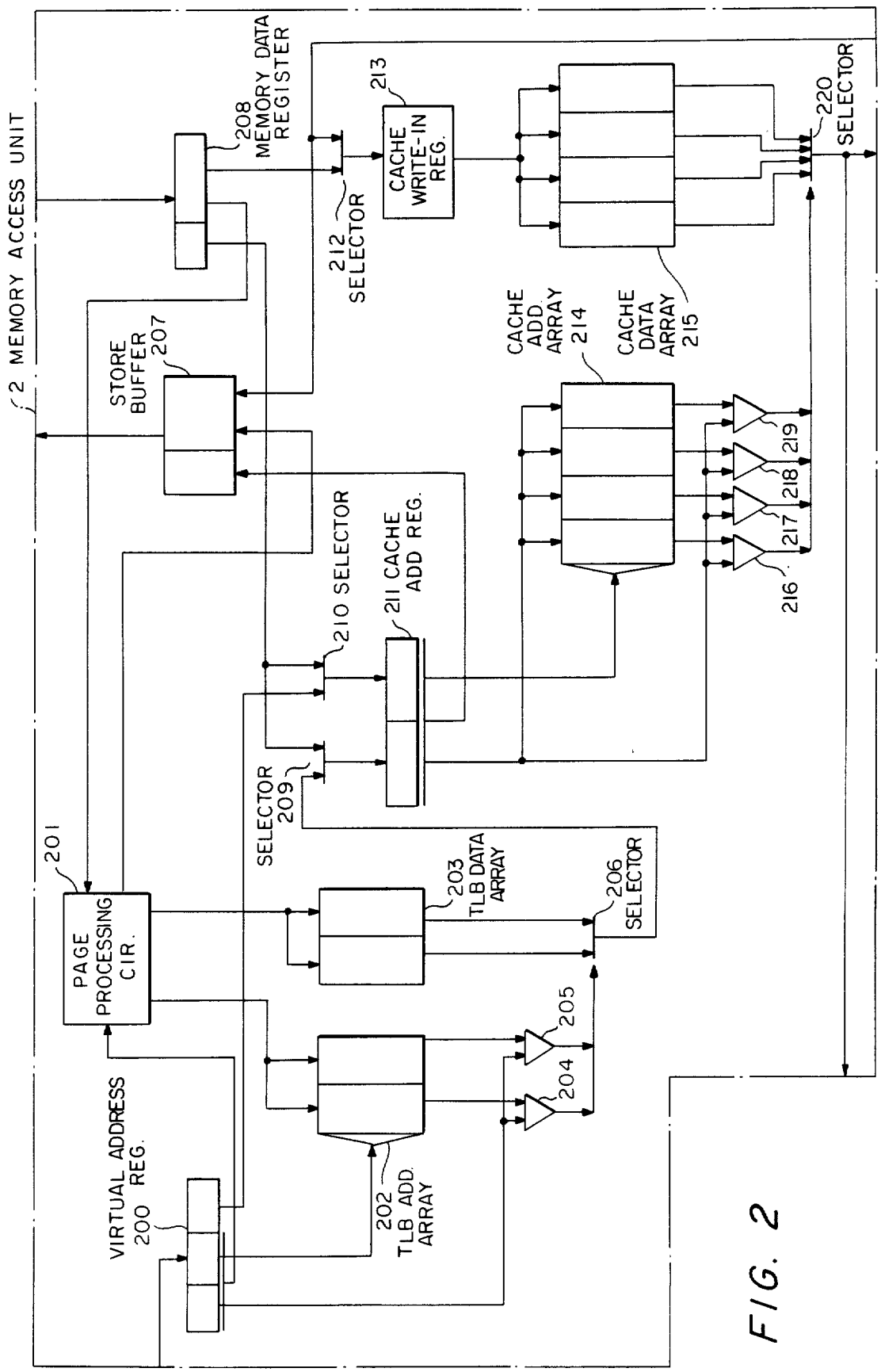
FIG. 2 is a block diagram of a memory access unit 2 shown in FIG. 1.

Referring to FIG. 2, a virtual address for reading out the BCT instruction from the advanced control unit 3 shown in FIG. 1 is stored in a virtual address register 200. The higher order bits of the address stored in the register 200 are, if necessary, processed by a paging processing circuit 201 and at the same time, the virtual addresss is converted into real address by TLB (translation look-aside buffer) address array 202 comparators 204 and 205 and TLB data array 203. The converted real address is stored in the high order bit field of a cache address register 211 via selectors 206 and 209. In the low order bit field of the register 211 is stored the content of the low order bit field of the virtual address register 200. If the address stored in the cache address register 211 has been stored in the cache address array 214, as determined by comparators 216-219, the BCT instruction stored in the cache data array 215 is read out and sent to the advanced control unit 3 via the selector 220. If the desired read address has not been stored in the cache address array 214, the real address is given from the cache address register 211 to the MMU 1 shown in FIG. 1 via the store buffer 207. The BCT instruction read out from the MMU 1 in correspondence with the real address is stored temporarily in the cache address array 214 via selector 210 and cache address register 211 and in the cache data array 215 via the memory data register 208, the selector 212 and the cache write-in register 213. The BCT instruction stored in the array 215 is given to the advanced control unit 3 via the selector 220.

Description will now be made in reference to the pipeline control in this embodiment.

Figure 3:
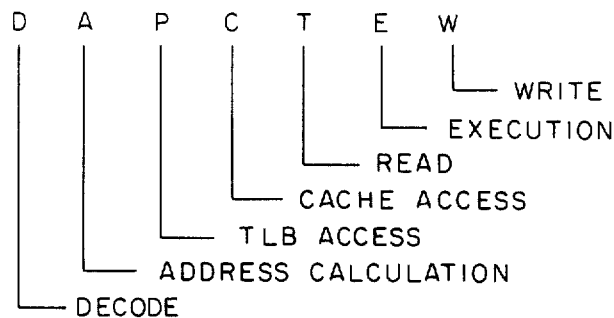
FIG. 3 is an explanatory view for describing each stage of pipeline control.

Referring to FIG. 3, each instruction comprises seven stages; i.e., instruction decoding stage D, address calculation stage A, TLB access (address conversion) stage P, cache access stage C, general register 5/operand buffer 4 read-out stage T, instruction execution stage E and write-in stage W.

The operation of the control system in this embodiment will be described in more detail referring to FIG. 6 which is plotted with these seven stages on the X axis, and FIGS. 1, 4 and 5.

Figure 4:
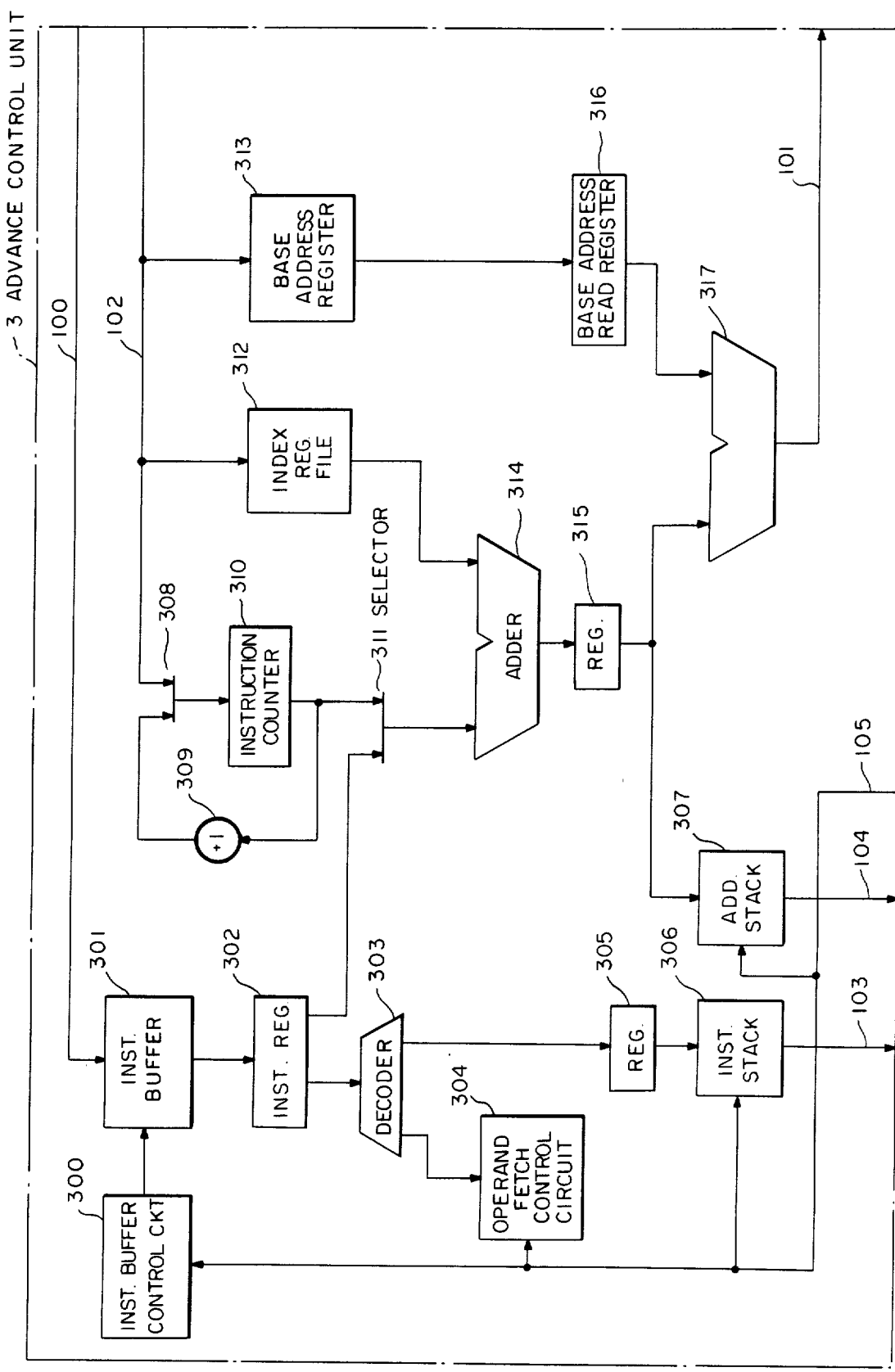
FIG. 4 is a block diagram of an advanced control unit 3 shown in FIG. 1.
Figure 6:
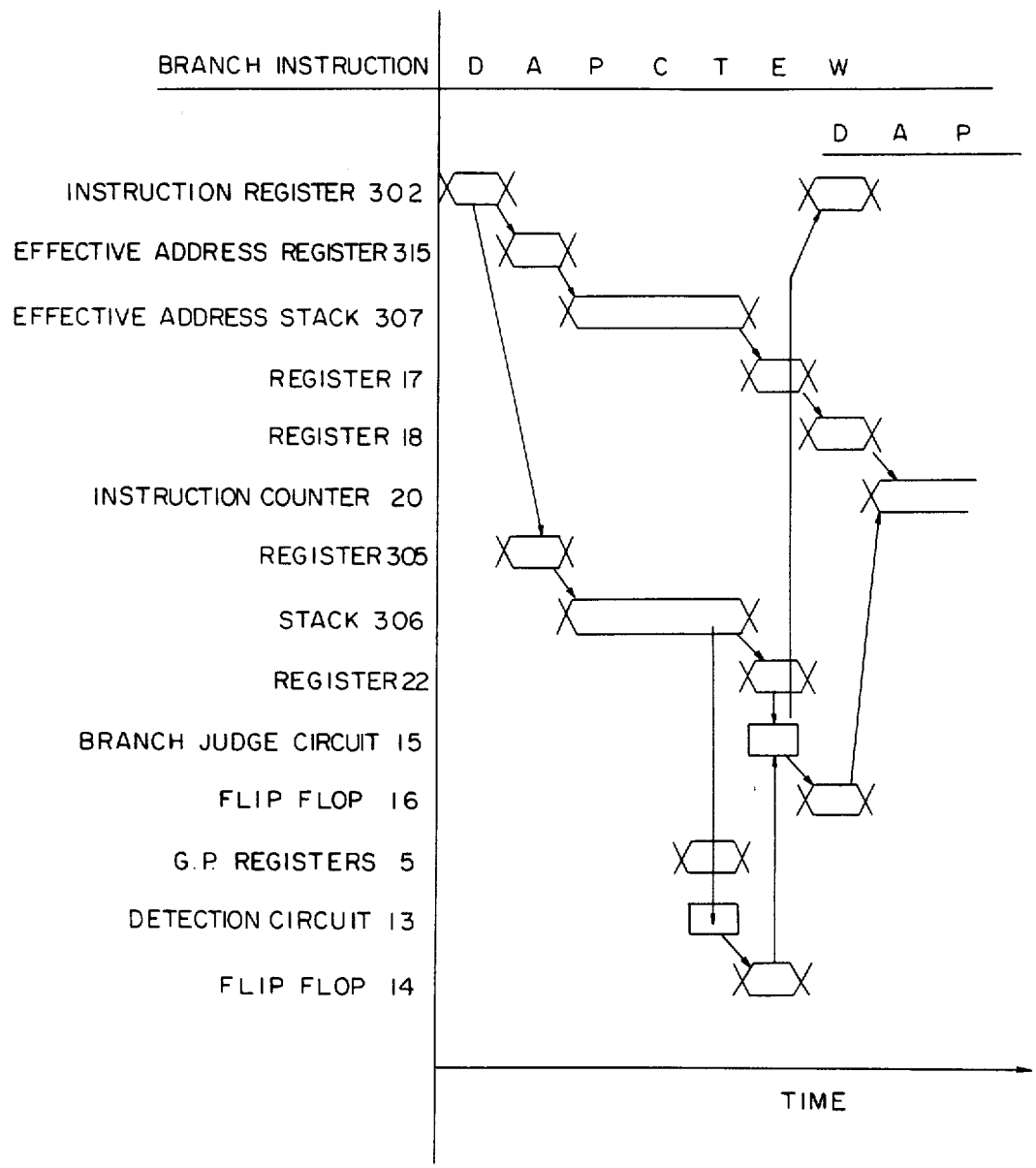
FIG. 6 is a timing chart for illustrating a processing procedure of a control system in the embodiment.

Referring to FIGS. 4 and 6, the BCT instruction from the memory access unit 2 is stored in the instruction register 302 via a line 100 and an instruction buffer 301. The content of the BCT instruction address field fed via the selector 311 and the content of the index register file 312 are added by an effective address adder 314. The result of addition from the adder 314, that is, the effective address of the branch instruction, is stored in an effective address register 315. The effective address of the register 315 is stored in an effective address stack 307. OP (operation) codes of the instruction register 302, on the other hand, are decoded by an instruction decoder 303 and set at a decoded instruction register 305. The result of decoding is stored in a decoded instruction stack 306. The above-mentioned processing is executed by the advanced control unit 3.

Referring to FIGS. 1, 4 and 6, the data in the 36 bits read out from the GP register group 5 is detected by the detection circuit 13 whether to be "1" or not in the T stage. The effective address and the result of decoding are read out from the effective address stack 307 and decoded instruction stack 306 to the lines 104 and 103.

Referring to FIGS. 1 and 6, operands are read out from the GP register group 5 in the data system.

At the stage E, the read out operand is stored in the operand register 9 and subtracted "one" which is the content of the operand register 10 by the ALU 11. In the control system, the decoding result given via the line 103 is stored in the register 22, and, at the same time, the effective address given via the line 104 is stored in the register 17. If the result detected by the detection circuit 13 is "1", the flip-flop 14 is set. Whether or not the branch indicated by the BCT instruction is taken is determined by the branch judging circuit 15 based upon the output of the flip-flop 14, the branch instruction type fed from the register 22 via the line 107, and the branch timing signal from the register 22 via the line 108.

The operation for judging the branch instruction will now be described in more detail referring to FIG. 5.

Figure 5:
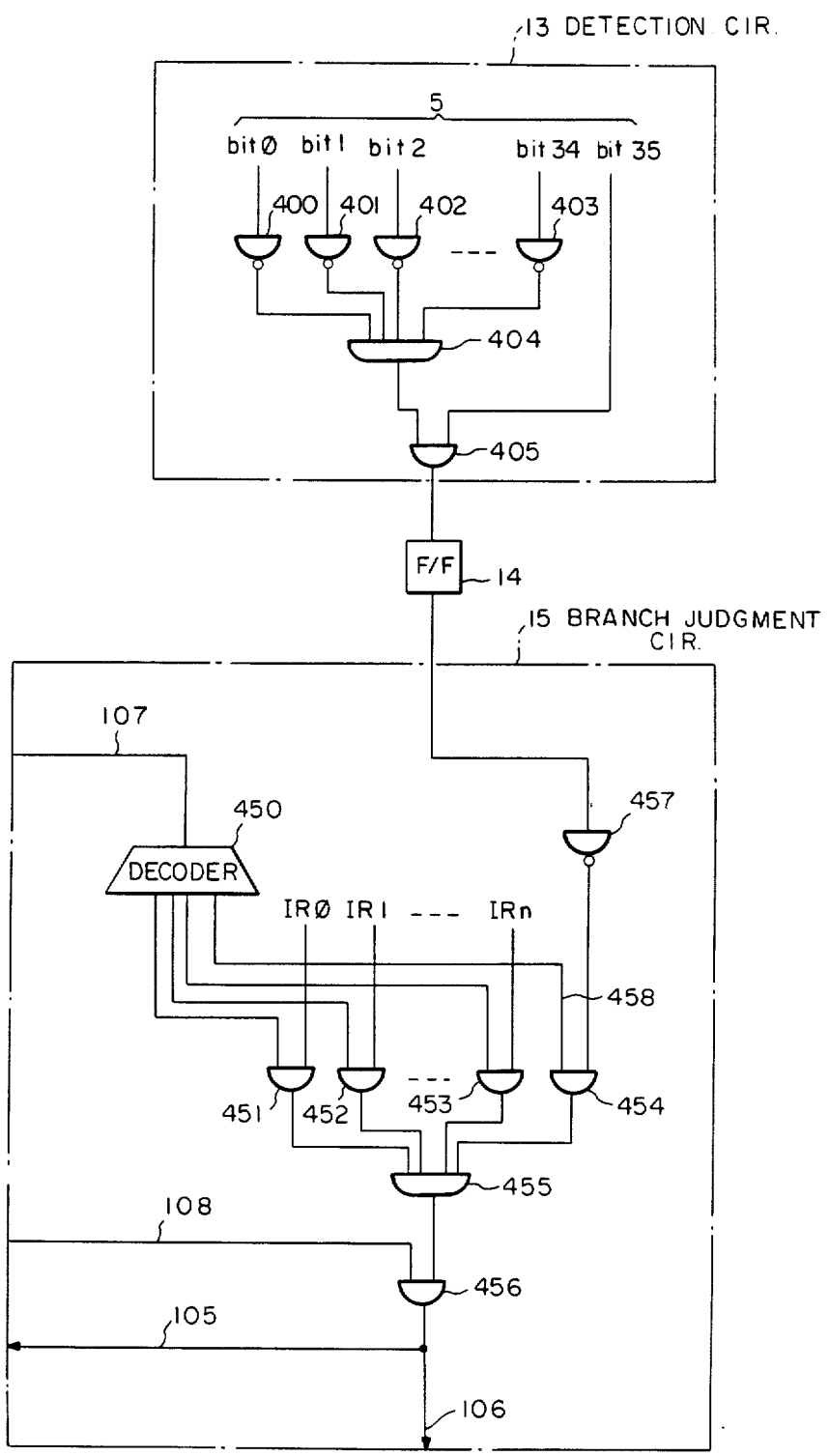
FIG. 5 is a circuit diagram of a detection circuit 13 and a branch judgement circuit 15 shown in FIG. 1.

In FIG. 5, a branch instruction type given via the line 107 is decoded by a decoder 450 and different branch conditions are selected for each branch instruction. The branch conditions for branch instructions IR0-IRn other than BCT instructions are stored in an indicator register (not shown). In the case of the BCT instructions, the signal line 458 out of the outputs of the decoder 450 becomes "1" to be subjected to the AND operation with the negative output of the flip-flop 14 by an AND gate 454. The output therefrom is given to the AND gate 456 via an OR gate 455 and subjected to the AND operation with the branch timing signal given via the line 108 and transmitted to the lines 105 and 106 as the branch establishment signals. In other words, in the case where the branch instruction is a BCT instruction, and when the content of the flip-flop 14 is "0", the signal "1" on the lines 105 and 106 indicates that the branch is taken. When the content of the flip-flop 14 is "1", the signal "0" on the lines 105 and 106 means the branch is not taken.

At the stage W, the effective address is stored from the register 17 at the register 18. The branch establishing signals fed from the line 106 is set at the flip-flop 16. The branch establishing signal is given to the advanced control unit 3 via the line 105 to actuate the instruction buffer control circuit 300 shown in FIG. 4 and to store the next instruction from the instruction buffer 301 at the instruction register 302. When the content of the flip-flop 16 is "1" or when the branch is taken, the branch address which has been tansferred via the register 17 and 18 is selected to be set at the instruction address register 20. On the other hand, when the output from the flip-flop 16 is "0" or the branch is not taken or when it is not at branch timing, the content of the instruction counter 20 is added by "1" because the selector 19 selects the adder 21.

The enhancement achieved by this invention in execution performance for each BCT instruction is explained by referring to an embodiment of this invention by comparison with a prior art branch instruction processing unit hereinafter.

Figure 7:
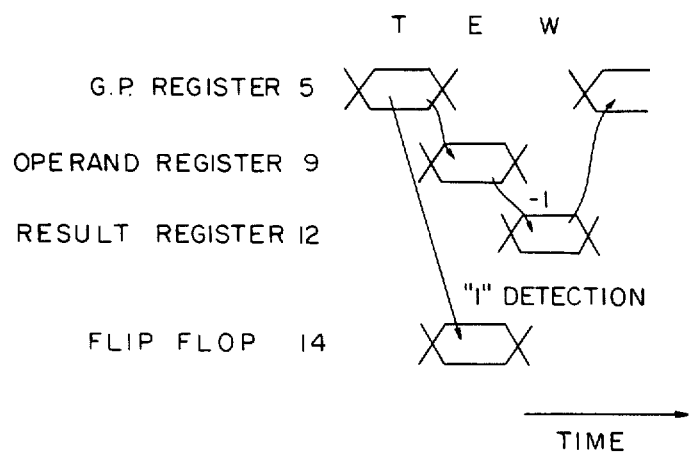
FIG. 7 is a timing chart for illustrating a processing procedure of a data system in the embodiment.

Referring to FIG. 7, according to an embodiment of this invention, the content of one GP register out of the GP register group 5 is detected to learn whether or not it is "1" at the stage T, and the flip-flop 14 is set. Whether or not the branch is taken is judged depending on the content of the flip-flop 14. The operation therefor is conducted at the stage E in this invention to enhance the performance in execution of branch instructions.

The above-described embodiment is considered to be merely illustrative of the present invention and numerous modifications thereof may be devised by these skilled in the art without departing from the spirit and scope of the invention defined by the appended claim.

What is claimed is:

1. A branch instruction processing unit which executes branch-on-count instructions for loop control of a program by means of pipeline control, comprising:
   memory means for storing a number of loop times designated by each of said branch-on-count instructions;
   first control means for loading the number of loop times into said memory means from a loop times holding register;
   first storing means for storing an output of said memory means;
   detection means for detecting whether or not the output of said memory means is equivalent to a predetermined value while the output is being stored in said first storing means;
   decrementing means for decrementing a count of said first storing means by a preselected value following said detecting by the detection means that said output of said memory means is equivalent to said predetermined value;
   second storing means for storing an output of said decrementing means;
   second control means for writing the output of said second storing means into said memory means; and
   branch execution means responsive to an output of said detection means for transferring control to branch address when said detection means detects that an output of said memory means is equal to said predetermined value upon execution of said branch-on-count instruction and not branching to said branch address when said detection means detects that an output of said memory means is not equal to said predetermined value.

2. A branch instruction processing unit as claimed in claim 1, wherein said detection means comprises a detection circuit and a flip-flop that is set in response to the output of said detection circuit.

3. A branch instruction processing unit as claimed in claim 1, wherein said preselected value is a logic "1".

4. A method of operating a branch instruction processing unit which executes branch-on-count instructions for loop control of a program by means of pipeline control, comprising the steps of:
   (1) storing, in a memory, a number of loop times designated by each of said branch-on-count instructions;
   (2) storing, in a first storing device, an output of said memory;
   (3) detecting, in a detecting device, whether or not the output of said memory is equivalent to a predetermined value while the output is being stored in said first storing device;
   (4) decrementing, in a decrementing device, a count of said first storing device by a preselected value after said detecting step detects that said output of said memory is equivalent to said predetermined value;
   (5) storing, in a second storing device, an output of said decrementing device;
   (6) writing the output of said second storing device into said memory; and
   (7) after said detecting step, transferring control to a branch address unless said detecting device detects that an output of said memory is equal to said predetermined value upon execution of said branch-on-count instruction.

* * * * *